3,649,631
Patented Mar. 14, 1972

3,649,631
N'-THIAZOLYLALKYL-, N' - PYRAZOLYLALKYL-, AND N'-IMIDAZOLYLALKYL-N-(THIAZOLYL-2)-PIPERAZINES
Volker Koppe, Karl Schulte, Hans-Joachim Schliep, and Ernst Schorscher, Darmstadt, Germany, assignors to Merck Patent Gesellschaft mit beschrankter Haftung, Darmstadt, Germany
No Drawing. Filed Aug. 28, 1969, Ser. No. 853,955
Claims priority, application Germany, Sept. 11, 1968, P 17 95 314.9
Int. Cl. C07d 51/70
U.S. Cl. 260—268 H          13 Claims

ABSTRACT OF THE DISCLOSURE

N'-substituted-N-(thiazolyl-2)-piperazines, wherein the N'-substituent is a thiazolyl-5-alkyl-, pyrazolyl-3-alkyl-, pyrazolyl-5-alkyl-, or imidazolyl-5-alkyl group, having vasodepressor activity and one or more narcosis-prolonging, narcosis-potentiating, tranquilizing and neuroleptic activity are produced by reacting the corresponding unsubstituted N-(thiazolyl-2)-piperazine with a thiazolyl-, pyrazolyl-, or imidazolyl-lower alkylhalide; a thiazolyl-, pyrazolyl-, or imidazolyl-lower alkyl-piperazine with a 2-halo-thiazol; a thiazolyl-, pyrazolyl-, or imidazolyl-lower alkylamine with a 2-(N,N-di-haloethyl-amino)-, 2-(morpholino)-, or 2-(thiomorpholino)-thiazole, or a 2-(thiazolyl-, pyrazolyl-, or imidazolyl-lower-alkylaminoethyl-amino)-thiazol with a dihaloethane.

This invention relates to N-(thiazolyl-2)-piperazines of the formula:

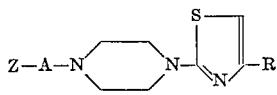

wherein

Z represents a thiazolyl-5, pyrazolyl-3, pyrazolyl-5 or imidazolyl-5 group, unsubstituted or substituted on ring nitrogen and/or carbon atoms with 1-3 methyl groups;
A represents a linear or branched alkylene group of 1-4 carbon atoms; and
R represents H or CH$_3$, and the physiologically acceptable acid addition salts thereof, to processes for their production and to their use as vasodepressors. The compounds of this invention possess valuable pharmacological properties, exhibiting beneficial effects on the circulation and the central nervous system, with no significant deleterious effects on the other circulatory functions. More particularly, they have blood-pressure-lowering (vasodepressor) activity, even in very low doses, and one or more of narcosis-prolonging, narcosis-potentiating, tranquilizing and neuroleptic activity.

Tests verifying vasodepressor activity were conducted in conscious rats having experimentally induced hypertonia.

The experiments regarding vasodepressor activity in renal hypertensive dogs (I. H. Page, Science, vol. 89, p. 273 (1939); H. Goldblatt et al., American J. Pathol., vol. 9, p. 942 (1933)) were performed according to W. Schröder, Z.f.ges. experimentelle Medizin, vol. 130, p. 513 (1959). For example, a single dose of 0.05 mg./kg. of N-[4(2,4-dimethyl-thiazolyl - 5)-butyl]-N'-(4-methyl-thiazolyl-2)-piperazine given orally to hypertensive conscious dogs induced a depressor-response of 25 to 40 mm. Hg lasting for more than 4 hours. The tests on conscious rats having experimentally induced hypertonia (DOCA-NaCl-hypertension: C. A. Rosenberg et al., J. Clin. Endocrinology vol. 12, p. 666 (1952); cellophane-perinephritis adapted for rats: Page 1c.) were performed according to a method similarly to that described in Bucke and Brecht, Naunyn-Schmiedeberg's Archiv, vol. 217, p. 399 (1953).

The narcosis-prolonging effect can be determined according to Ruemke and Bout, Arch. exp. Pathol. u. Pharmakol., vol. 240, p. 218 (1960); the narcosis-potentiating activity according to Janssen et al., J. Med. Pharm. Chem., vol. 1, p. 287 (1959); the tranquilizing activity according to Piala et al., J. Pharmakol. exp. Therap., vol. 127, 55 (1959); the neurolepic activity according to Janssen et al., Arzneimittelforschung vol. 11, p. 1037 (1961) and vol. 15, p. 105 (1965).

The N-(thiazolyl-2)-piperazines of this invention can be prepared by any of the following processes, in which Z, A and R have the meanings given above:

(A) A compound of Formula II

wherein

X represents Cl, Br, I or a halogen-analogous residue which can be replaced by an amino group, is reacted with a (thiazolyl-2)-piperazine of Formula III

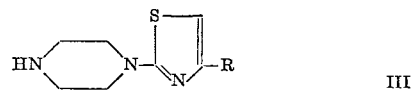

(B) A substituted alkyl piperazine of Formula IV

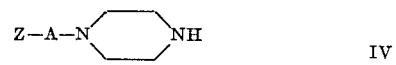

is reacted with a thiazole derivative of Formula V

(C) An amine of Formula VI

is reacted with an aminothiazole derivative of Formula VII

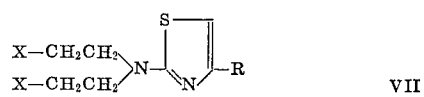

wherein the two X-groups, in addition to the meanings given above, collectively can be a single oxygen or sulfur atom;

(D) An ethylenediamine derivative of Formula VIII

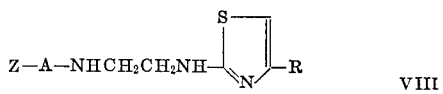

is reacted with a dihaloethane of Formula IX

(E) A compound otherwise corresponding to Formula I containing one or more groups replaceable by hydrogen atoms and/or containing C—C unsaturation, is reacted with a reducing or hydrogenating agent.

The compounds of Formula I in free base form can be converted to a physiologically compatible acid addition salt thereof by treatment with the corresponding acid, preferably under anhydrous conditions. The compounds of Formula I in free base form can be produced from the acid addition salt thereof by reacting with aqueous base, e.g. NaOH.

In the above formulae, Z represents thiazolyl-5, pyrazolyl-3, pyrazolyl-5 or imidazolyl-5 and the corresponding groups substituted with 1 to 3, preferably 1 or 2 methyl groups, on ring carbon atoms thereof, preferably 2-methylthiazolyl-5, 4-methyl-thiazolyl-5, 2,4-dimethyl-thiazolyl-5 or 5-methyl-pyrazolyl-3.

Other examples are 1-methyl-pyrazolyl-3,
4-methyl-pyrazolyl-3,
1,4-dimethyl-pyrazolyl-3,
1,5-dimethyl-pyrazolyl-3,
4,5-dimethyl-pyrazolyl-3,
1,4,5-trimethyl-pyrazolyl-3,
1-methyl-pyrazolyl-5,
1,3-dimethyl-pyrazolyl-5,
1,4-dimethyl-pyrazolyl-5,
1,3,4-trimethylpyrazolyl-5,
1-methyl-imidazolyl-5,
2-methyl-imidazolyl-5,
4-methyl-imidazolyl-5,
1,2-dimethyl-imidazolyl-5,
1,4-dimethyl-imidazolyl-5,
2,4-dimethyl-imidazolyl-5, and
1,2,4-trimethyl-imidazolyl-5.

The group A represents a bridging lower-alkylene group, e.g. preferably: —CH$_2$—, —CH$_2$CH$_2$—,

—CHCH$_3$—

—CH$_2$CH$_2$CH$_2$— and —CH$_2$CH$_2$CH$_2$CH$_2$—.
Other examples are

—CH(CH$_3$)CH$_2$—, —CH$_2$CH(CH$_3$)—, —CHC$_2$H$_5$—
—CH(CH$_3$)CH$_2$CH$_2$—, —CH$_2$CH(CH$_3$)CH$_2$—
—CH$_2$CH$_2$CH(CH$_3$)—, —CH(C$_2$H$_5$)CH$_2$—
—CH$_2$CH(C$_2$H$_5$)—, —CH(n—C$_3$H$_7$)—, and
—CH(iso—C$_3$H$_7$)—

The definition of X includes, in addition to Cl, Br and I, halogen-analogous residues which are replaceable by an amino group, i.e. residues which, upon reaction with an amine, are replaced by an amino group in a manner comparable to halogen atoms, e.g. hydroxy; acyloxy, preferably alkanoyloxy of 1–6 carbon atoms, e.g. acetoxy; alkanesulfonyloxy, preferably of 1–4 carbon atoms, e.g. methanesulfonyloxy; arylsulfonyloxy preferably of 6–10 carbon atoms, e.g. p-toluenesulfonyloxy. It is also possible under reducing conditions to start with compounds otherwise corresponding to Formulae II, VII or IX, which contain, in place of one or two CHX residues, an aldehyde, ester, or other group which is reduced under the reaction conditions to a hydroxy group.

The expression "groups replaceable by hydrogen atoms" includes halogen atoms, preferably chlorine or bromine atoms, carbonyl oxygen, hydroxy and benzyl groups.

Preferred unsaturated compounds are those having a C—C double bond, but compounds having a C—C triple bond can likewise be converted into the corresponding saturated compounds by treatment with a hydrogenating agent.

The preceding processes for the preparation of the piperazines of Formula I will now be described in detail.

Illustrative of the starting compounds of Formula II are:

1-(thiazolyl-5)-2-chloroethane,
1-(thiazolyl-5)-3-chloropropane,
1-(thiazolyl-5)-4-chlorobutane,
1-(2-methyl-thiazolyl-5)-2-chloroethane,
1-(2-methyl-thiazolyl-5)-3-chloropropane,
1-(2-methyl-thiazolyl-5)-4-chlorobutane,
1-(4-methyl-thiazolyl-5)-2-chloroethane,
1-(4-methyl-thiazolyl-5)-3-chloropropane,
1-(4-methyl-thiazolyl-5)-4-chlorobutane,
1-(2,4-dimethyl-thiazolyl-5)-2-chloroethane,
1-(2,4-dimethyl-thiazolyl-5)-3-chloropropane,
1-(2,4-dimethyl-thiazolyl-5)-4-chlorobutane,
1-(pyrazolyl-3)-2-chloroethane,
1-(pyrazolyl-3)-3-chloropropane,
1-(pyrazolyl-3)-4-chlorobutane,
1-(1-methyl-pyrazolyl-3)-2-chloroethane,
1-(1-methyl-pyrazolyl-3)-3-chloropropane,
1-(1-methyl-pyrazolyl-3)-4-chlorobutane,
1-(5-methyl-pyrazolyl-3)-2-chloroethane,
1-(5-methyl-pyrazolyl-3)-3-chloropropane,
1-(5-methyl-pyrazolyl-3)-4-chlorobutane,
1-(1-methyl-imidazolyl-5)-2-chloroethane,
1-(1-methyl-imidazolyl-5)-3-chloropropane, and
1-(1-methyl-imidazolyl-5)-4-chlorobutane.

The corresponding bromoalkanes, iodoalkanes, alkanols and the esters thereof, especially the methane- and p-toluenesulfonate esters thereof can be used instead of the above-named chlorides.

The compounds of Formula III are 1-(thiazolyl-2)-piperazine and 1-(4-methyl-thiazolyl-2)-piperazine.

The piperazines of Formula I are preferably produced by reacting a compound of Formula II with a thiazolyl-2-piperazine of Formula III. Some of the compounds of Formula II are known, e.g. 1-(4-methyl-thiazolyl-5)-2-chloroethane and 4(5)-hydroxymethyl-imidazole. The others can readily be produced in a manner analogous to that used to produce the known compounds. For example, the known 7-chloroheptanone-(2) can be chlorinated with SO$_2$Cl$_2$ to 3,7-dichloroheptanone-(2), and conducting a thiazole ring closure on the latter in accordance with conventional methods using thioformamide or thioacetamide, produces 1 - (4 - methyl-thiazolyl-5)-4-chlorobutane and 1 - (2,4 - dimethylthiazolyl-5)-4-chlorobutane, respectively. Compounds of Formula II wherein Z represents a pyrazolyl-3 group can be produced by reducing pyrazole-3-carboxylic acid esters catalytically or with LiAlH$_4$ to the corresponding 3-hydroxymethyl-pyrazoles. 2-hydroxy-4-pyrones can be converted with hydrazine to pyrazole-3-acetic acid hydrazides, which can be converted to the corresponding esters by alcoholysis. By the reduction of these esters, 3-(2-hydroxyethyl)-pyrazoles can be produced. 3-(3-hydroxypropyl)- and 3-(4-hydroxybutyl)-pyrazoles, respectively, can be produced by the condensation of acetone with γ-butyrolactone or δ-valerolactone to produce 2-hydroxy-2-acetylmethyl-tetrahydrofuran and -tetrahydropyran, respectively, which are then reacted with hydrazine. Compounds of Formula II wherein Z represents a 1-methyl-imidazolyl-5-group can be produced, for example, from the known 1-methyl-5-formyl-imidazole by reduction to 1 - methyl - 5-hydroxymethyl-imidazole, which is then reacted with thionyl chloride to yield 1-methyl-5-chloromethyl-imidazole.

The chloromethyl or the 2-chloroethyl side chain can be extended by a methylene group in a conventional manner by replacing the halogen atom with a nitrile group, converting the latter into an ester group, reducing the ester with LiAlH$_4$ to the corresponding alcohol, and replacing the latter with a halogen atom by treatment with thionyl chloride. An extension by two methylene groups is effected by reacting the halide with sodium malonate, saponification and decarboxylation of the malonate, reesterification of the resulting acid and reduction of the ester to the corresponding alcohol, e.g. with LiAlH$_4$, and conversion thereof to the corresponding halide. Primary alcohols of the formula Z—A—OH, wherein Z and A have the values given above can be produced by reducing the corresponding carboxylic acids or the esters thereof. Secondary and tertiary alcohols can be obtained from corresponding aldehydes and ketones by reduction or by reaction with organometallic compounds. Treating the alcohols of the formula Z—A—OH with thionyl chloride, hydrogen bromide, phosphorus tribromide, or similar halogen compounds produces the corresponding halides of the formula Z—A—Cl or Z—A—Br. The sulfonyloxy compounds are obtainable from the same alcohols by reaction with the corresponding sulfonyl acid chlorides. Iodide compounds of the formula Z—A—I are obtained, for example, by the reaction of potassium iodide with the corresponding p-toluenesulfonic acid esters. The piperazines of Formula III are obtained by the reaction of piperazine and a thiazole derivative of Formula V, preferably a 2-chloro- or 2-bromo-thiazole.

The reaction of compounds II and III takes place in accordance with methods known in the art for the alkylation of amines. The reaction can be conducted without solvent by melting the components together, e.g. in a sealed tube or in an autoclave. If desired, it can also be conducted in the presence of an inert solvent, e.g. benzene, toluene, xylene, acetone, butanone or other ketone, methanol, ethanol, or other alcohol, tetrahydrofuran or dioxane, or mixtures of these solvents, or in a mixture with water. The addition of an acid-neutralizing agent is advantageous, for example, a hydroxide, carbonate, bicarbonate or another salt of a weak acid and an alkali-metal or alkaline earth metal, preferably a salt of potassium, sodium, or calcium, or an organic base, e.g. triethylamine, dimethylaniline, pyridine or quinoline, or an excess of the piperazine derivative of Formula III. The reaction time ranges, depending on the conditions employed, between several minutes and 14 days; and the reaction temperature can vary between 0 and 200° C., usually 100–130° C. If the reaction is conducted without solvents at about 120° C., the reaction is complete in about ½ to 2 hours. When using solvents, it is sometimes necessary to heat the reaction mixture for 12–24 hours or longer, in order to obtain satisfactory yields.

In a modification of the above-described process, an aldehyde of Formula X

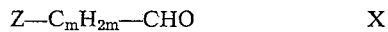
$$Z—C_mH_{2m}—CHO \qquad X$$

wherein $m$ represents an integer from 1–3 and Z has the value given above, is reacted with a piperazine of Formula III under catalytic hydrogenation conditions. The reaction conditions are those known in the art for reductive alkylations. The aldehydes of Formula X can be obtained by partial oxidation of the corresponding primary alcohols of Formula II wherein X=OH or by hydrogenation of the corresponding acid chlorides in the presence of a Pd/BaSO$_4$ catalyst.

The compounds of Formula I can also be produced by reacting a piperazine of Formula IV with a thiazole derivative of Formula V.

The piperazines of Formula IV can be obtained either by reacting a halide of the formula Z—A—Cl or

$$Z—A—Br$$

with 1-benzylpiperazine followed by reductive elimination of the benzyl group, or by reacting an amine of Formula VI with diethanolamine, morpholine, or bis(2-chloroethyl)-amine. Preferably, the following piperazines of Formula IV are employed:

1-(thiazolyl-5)-2-piperazinoethane,
1-(thiazolyl-5)-3-piperazinopropane,
1-(thiazolyl-5)-4-piperazinobutane,
1-(2-methyl-thiazolyl-5)-2-piperazinoethane,
1-(2-methyl-thiazolyl-5)-3-piperazinopropane,
1-(2-methyl-thiazolyl-5)-4-piperazinobutane,
1-(4-methyl-thiazolyl-5)-2-piperazinoethane,
1-(4-methyl-thiazolyl-5)-3-piperazinopropane,
1-(4-methyl-thiazolyl-5)-4-piperazinobutane,
1-(2,4-dimethyl-thiazolyl-5)-2-piperazinoethane,
1-(2,4-dimethyl-thiazolyl-5)-3-piperazinopropane,
1-(2,4-dimethyl-thiazolyl-5)-4-piperazinobutane,
1-(pyrazolyl-3)-2-piperazinoethane,
1-(pyrazolyl-3)-3-piperazinopropane,
1-(pyrazolyl-3)-4-piperazinobutane,
1-(1-methyl-pyrazolyl-3)-2-piperazinoethane,
1-(1-methyl-pyrazolyl-3)-3-piperazinopropane,
1-(1-methyl-pyrazolyl-3)-4-piperazinobutane,
1-(5-methyl-pyrazolyl-3)-2-piperazinoethane,
1-(5-methyl-pyrazolyl-3)-3-piperazinopropane,
1-(5-methyl-pyrazolyl-3)-4-piperazinobutane,
1-(1-methyl-imidazolyl-5)-2-piperazinoethane,
1-(1-methyl-imidazolyl-5)3-piperazinopropane,
1-(1-methyl-imidazolyl-5)-4-piperazinobutane.

The thiazole derivatives of Formula V are either known or can readily be produced by methods known in the art for the synthesis of 2-halo-thiazoles. The compounds IV and V are reacted in accordance with the above-mentioned known methods of N-alkylation.

The compounds of Formula I can also be produced by forming the piperazine ring from appropriate starting products. Thus, one can react amines of Formula VI with aminothiazole derivatives of Formula VII. The amines of Formula VI can be produced by the reaction of compounds of Formula II with potassium phthalimide, or by the reduction of the corresponding nitriles. The aminothiazoles of Formula VII can be produced, for example, by reacting 2-halo-thiazoles of Formula V with diethanolamine or by reacting 2-aminothiazole or 2-amino-4-methyl-thiazole with ethylene oxide, followed by conversion of the hydroxy groups to halogen atoms, e.g. with thionyl chloride. Preferred starting compounds of Formula VI are:

1-(thiazolyl-5)-2-aminoethane,
1-(thiazolyl-5)-3-aminopropane,
1-(thiazolyl-5)-4-aminobutane,
1-(2-methyl-thiazolyl-5)2-aminoethane,
1-(2-methyl-thiazolyl-5)-3-aminopropane,
1-(2-methyl-thiazolyl-5)-4-aminobutane,
1-(4-methyl-thiazolyl-5)-2-aminoethane,
1-(4-methyl-thiazolyl-5)-3-aminopropane,
1-(4-methyl-thiazolyl-5)-4-aminobutane,
1-(2,4-dimethyl-thiazolyl-5)-2-aminoethane,
1-(2,4-dimethyl-thiazolyl-5)-3-aminopropane,
1-(2,4-dimethyl-thiazolyl-5)-4-aminobutane,
1-(pyrazolyl-3)-2-aminoethane,
1-(pyrazolyl-3)-3-aminopropane,
1-(pyrazolyl-3)-4-aminobutane,
1-(1-methyl-pyrazolyl-3)-2-aminoethane,
1-(1-methyl-pyrazolyl-3)-3-aminopropane,
1-(1-methyl-pyrazolyl-3)-4-aminobutane,
1-(5-methyl-pyrazolyl-3)-3-aminoethane,
1-(5-methyl-pyrazolyl-3)-3-aminopropane,
1-(5-methyl-pyrazolyl-3)-3-aminobutane,
1-(1-methyl-imidazolyl-5)-2-aminoethane,
1-(1-methyl-imidazolyl-5)-4-aminobutane.

Examples of compounds of Formula VII are 2-[bis-(2-chloroethyl)-amino]-thiazole and 2 - [bis-(-2-bromoethyl)-amino]-thiazole and the 4 - methyl derivatives thereof, N-(thiazolyl-2) - morpholine and N-(4-methyl-thiazolyl-2)-morpholine.

Compounds of Formula I can also be obtained by the known Bischoff piperazine synthesis, by reacting ethylenediamines of Formula VIII with ethylene dichloride, ethylene dibromide, or an analogous compound of Formula IX, preferably in the presence of an acid-binding agent.

The Bischoff synthesis takes place under the conditions generally employed for N-alkylations, except somewhat more vigorous conditions are usually employed. For example, the reaction mixture is heated with stirring, optionally, in the presence of a higher-boiling inert solvent and a strong base, e.g. as sodium hydroxide or carbonate, at temperatures between 120 and 160° C. for 6–8 hours.

The compounds of Formula VIII can be obtained by reacting aldehydes of Formula X with a corresponding N-thiazolyl-ethylenediamine to form the Schiff base, and catalytically hydrogenating the latter. Examples of compounds of Formula VIII are:

N-[3-(3-methyl-pyrazolyl-5)-propyl-1]-N'-(thiazolyl-2)-ethylenediamine;
N-[4-(1,3-dimethyl-pyrazolyl-5-butyl-1]-N'-(thiazolyl)-2)-ethylenediamine;
N-[1-(2,4-dimethyl-thiazolyl-5)-propyl-2]-N'-(thiazolyl-2)-ethylenediamine;
N-[4-(4-methylthiazolyl-5)-butyl-1]-N'-(4-methyl-thiozolyl-2)-ethylenediamine.

A compound of Formula I can also be obtained starting with an initial product containing, in place of hydrogen atoms, one or several groups replaceable by hydrogen atoms and/or C=C double bonds and/or C≡C triple bonds, and treating this unsaturated compound with a hydrogenating agent. For example, chlorine or bromine atoms on a heterocyclic ring or in the chain can be replaced by hydrogen by catalytic hydrogenolysis or by treatment with a chemical reducing agent. For example, N-[4 - (2,4 - dimethyl - thiazolyl-5) - butyl-1]-N'-(4-hydroxymethyl-thiazolyl-2)-piperazine can be catalytically hydrogenated to the corresponding N' - (4 - methyl-thiazolyl-2)-derivative. Also, a (thiazolyl-2)-piperazine of Formula III can be reacted with an acid or a thioacid of the formula

or

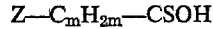

wherein Z has the value given above, or with functional derivatives of such carboxylic acids or thiocarboxylic acids to obtain the corresponding amide and thioamide, respectively, which can then be converted into a compound of Formula I by reducing the carbonyl function with complex metal hydrides, e.g. lithium aluminum hydride. The acids of the formula Z—C$_m$H$_{2m}$—COOH can be prepared by oxidizing the corresponding primary alcohols of Formula II, wherein X=OH or the corresponding aldehydes of Formula X, or by substituting the halogen in compounds of Formula II with a nitrile group, and then saponifying the latter to the corresponding acid. Acid derivatives, thiocarboxylic acids and thiocarboxylic acid derivatives can be obtained from the acids of the formula Z—C$_m$H$_{2m}$—COOH by conventional methods. Also, ethylenediamine derivatives of Formula VIII can be reacted with oxalic acid or haloacetic acids, or the functional derivatives thereof, or analogous sulfur compounds, to obtain compounds of the general formula

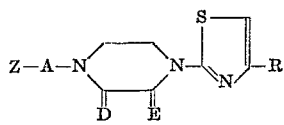

wherein

D and E each represents H$_2$, O or S, at least one of D and E representing O or S.

These compounds can be reduced to compounds of Formula I by known reductive methods, e.g. with lithium aluminum hydride, or by catalytic hydrogenation.

Reactions with lithium aluminum hydride are conducted according to methods known in the art in an inert solvent, preferably in ether, tetrahydrofuran or di-n-butyl ether, preferably also at their boiling point. In this connection, it is sometimes advantageous to continuously extract only slightly soluble starting substances with the boiling solvent.

Suitable catalysts for catalytic hydrogenations and/or hydrogenolyses are, for example, noble-metal, nickel and cobalt catalysts. The noble-metal catalysts can be on supports e.g. palladium on charcoal, calcium carbonate or strontium carbonate, can be oxide catalysts, e.g. platinum oxide, or can be finely divided metallic catalysts. Nickel and cobalt catalysts are suitably employed as Raney metals. Nickel is also used on kieselguhr (diatomite) or pumice as the support. The hydrogenation can be conducted at room temperature and ambient pressure, or at elevated temperature and/or elevated pressure. Preferably, the processes are conducted at pressures of between 1 and 100 atmospheres, and at temperatures of between —80° C. and +150° C., usually between room temperature and +100° C. The reaction is suitably conducted in the presence of a solvent, e.g. water, methanol, ethanol, isopropanol, n-butanol, ethyl acetate, dioxane, acetic acid and tetrahydrofuran, or a mixture thereof. In the hydrogenation, the free bases or the corresponding salts, e.g. the hydrochloride, can be employed. The hydrogenating conditions which are employed are those which do not also reduce the imidazole, pyrazole and thiazole rings thereby. Similarly, when hydrogenating C—C multiple bonds, and in the hydrogenolysis of benzyl groups, the step is preferably conducted at normal pressure in such a manner that the hydrogenation terminates after the stoichiometric amount of hydrogen has been absorbed.

The products of Formula I, obtained in accordance with one of the above-described methods, are isolated from the reaction mixtures in a conventional manner, e.g. by extraction and purified by distilling the bases or by crystallizing the bases or the salts thereof, preferably the hydrochlorides. Chromatographic methods can also be employed for isolating and purifying the product.

A piperazine derivative of Formula I obtained according to the process of this invention can be converted into an acid addition salt in a conventional manner using the corresponding acid, preferably anhydrous. For this reaction, those acids are suitable which yield physiologically acceptable salts, are ordinarily employed, e.g. organic and inorganic acids, such as, for example, aliphatic, alicyclic, araliphatic, aromatic or heterocyclic mono- or polybasic carboxylic or sulfonic acids, including formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, glycine and other aminocarboxylic acids, sulfamic acid, benzoic acid, salicyclic acid, phenylpropionic acid, citric acid, gluconic acid, ascorbic acid, isonicotinic acid, methanesulfonic acid, ethanedisulfonic acid, β-hydroxyethanesulfonic acid, p-toluenesulfonic acid, naphthalene-mono- and disulfonic acid, sulfuric acid, nitric acid, hydrohalic acids, such as hydrochloric acid or hydrobromic acid, and phosphoric acids, e.g. orthophosphoric acid. Other acids can be used for isolation and/or purification purposes, e.g. by crystallization and reconversion to the free base. The free bases of Formula I can be obtained, if desired, from the salts thereof by treatment with strong bases, such as sodium or potassium hydroxide, or sodium or potassium carbonate.

Preferred compounds of Formula I are those wherein Z represents thiazolyl-5 groups, unsubstituted or substituted by 1 or 2 methyl groups, a pyrazolyl-3, 1-methyl-pyrazolyl-3, 5-methyl-pyrazolyl-3 or 1-methyl-imidazolyl-5-group, A represents —CH$_2$CH$_2$—, —CH$_2$CH$_2$CH$_2$— or CH$_2$CH$_2$CH$_2$CH$_2$—, and R preferably represents CH$_3$.

Other important compounds of Formula I are those wherein A represents —CH$_2$— or a branched alkylene group, e.g.

N-(1,4-dimethyl-pyrazolyl-5-methyl)-N'-(thiazolyl-2) piperazine;

N-(1,4-dimethyl-pyrazolyl-5-methyl)-N'-(4-methyl-thiazolyl-2)-piperazine;

N-(4,5-dimethyl-pyrazolyl-3-methyl)-N'-(4-methyl-thiazolyl-2)-piperazine;

N-[1-(pyrazolyl-3)-propyl-1]-N'-(4-methyl-thiazolyl-2)-piperazine;

N-[1-(pyrazolyl-3)-propyl-1]-N'-(thiazolyl-2) piperazine;

N-[1-(4-methyl-pyrazolyl-3)-ethyl-1]-N'-(thiazolyl-2) piperazine;

N-[1-(4-methyl-pyrazolyl-3)-ethyl-1]-N'-(4-methy-thiazolyl-2)-piperazine;

N-[2-(4-methyl-pyrazolyl-3)-propyl-1]-N'-(4-methyl-thiazolyl-2)-piperazine;

N-[4-(2,4-dimethyl-thiazolyl-5)-butyl-2]-N'-(4-methyl-thiazolyl-2)-piperazine; and N-[3-(4-methyl-thiazolyl-5)-butyl-2]-N'-(4-methyl-thiazolyl-2)-piperazine.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, glycerol, gelatin, lactose, amylose, corn starch, potato starch, magnesium stearate, talc, Vaseline, cholesterol, etc.

For parenteral application, particularly suitable are solutions, preferably oily or aqueous solutions, as well as suspensions, emulsions, or implants. Ampoules are convenient unit dosages.

For enteral application, particularly suitable are tablets or dragees which are also characterized by talc and/or a carbohydrate carrier or binder or the like. The carbohydrate carrier being preferably lactose and/or corn starch and/or potato starch. A syrup or the like can also be used wherein a sweetened vehicle is employed.

The substances of this invention are generally administered to mammals in a dosage of 0.1–50 mg. per dosage unit. The dosage per weight ratio is about 0.001 to 1 mg. per kg. of body weight, the dosage being increased or decreased according to the response of the mammal. Generally speaking, the compounds of this invention will be used in the same manner as the known 2-(2,6-dichlorophenylamino)-2-imidazoline.

PREFERRED METHODS FOR PRODUCING STARTING MATERIALS

Example A

A solution of 15.7 g. of ethyl thiazolyl-(5) carboxylate in 75 ml. of diethyl ether is added dropwise to a suspension of 3.8 g. of lithium aluminum hydride in 75 ml. of diethyl ether. The mixture is boiled for 3 hours under a nitrogen atmosphere. After mixing with 60 ml. of ethyl acetate, 15 ml. of water and 4 ml. of 15% aqueous sodium hydroxide are added. The reaction mixture is vacuum-filtered, dried with potassium carbonate, and concentrated by evaporation. The residue is distilled in vacuo, giving 5-hydroxymethyl-thiazole.

In the same manner, the following compounds are produced:

from methyl (1,4-dimethyl-pyrazolyl-5)-carboxylate:
 1,4-dimethyl-5-hydroxymethyl-pyrazole;
from 1,5-dimethyl-pyrazolyl-3-aldehyde:
 1,5-dimethyl-3-hydroxymethyl-pyrazole;
from ethyl (1,3-dimethyl-pyrazolyl-5)-carboxylate:
 1,3-dimethyl-5-hydroxymethyl-pyrazole;
from ethyl (4-methyl-pyrazolyl-3)-carboxylate:
 4-methyl-3-hydroxymethyl-pyrazole;
from methyl (4,5-dimethyl-pyrazolyl-3)-carboxylate:
 4,5-dimethyl-3-hydroxymethyl-pyrazole;
from methyl (1-methyl-pyrazolyl-3)-carboxylate:
 1-methyl-3-hydroxymethyl-pyrazole;
from ethyl (3-methyl-pyrazolyl-5)-acetate (obtained by esterification of 3-methyl-pyrazolyl-5-acetic acid with ethanol in the presence of a catalytic amount of sulphuric acid):
 3-methyl-5-(2-hydroxyethyl)-pyrazole;
from methyl (1,3,4-trimethyl-pyrazolyl-5)-carboxylate:
 1,3,4-trimethyl-5-hydroxymethyl-pyrazole;
from ethyl (2-methyl-thiazolyl-5)-carboxylate:
 2-methyl-5-hydroxymethyl-thiazole;
from 3-propionyl-pyrazole:
 3-(1-hydroxypropyl-1)-pyrazole;
from 3-acetyl-4-methyl-pyrazole:
 4-methyl-3-(1-hydroxyethyl-1)-pyrazole;
from 3-acetyl-1,4-dimethyl-pyrazole:
 1,4-dimethyl-3-(1-hydroxyethyl-1)-pyrazole;
from methyl-[4(5)-methyl-imidazolyl-5(4)] - propionate (obtained by reaction of 4(5)-methyl-imidazolyl-5(4)-propionic acid with diazomethane):
 4(5)-methyl-5(4)-(3-hydroxypropyl)-imidazole;
from methyl imidazolyl-4(5)-propionate (obtained by reaction of imidazolyl-4(5)-propionic acid with diazomethane):
 4(5)-(3-hydroxypropyl)-imidazole; and
from methyl [2-methyl-imidazolyl-4(5)]-carboxylate (obtained by reaction of 2-methyl-imidazolyl-4(5)-carboxylic acid with diazomethane):
 2-methyl-4(5)-hydroxymethyl-imidazole.

Example B

A solution of 15 g. 4(5)-(4-aminobutyl)-imidazole in 100 ml. of 24% aqueous hydrochloric acid is heated to 85°, and a solution of 11 g. sodium nitrite in 50 ml. of water is added dropwise. After the addition is terminated, the mixture is heated for 15 minutes, made alkaline with a solution of sodium hydroxide, and extracted with ether. The extract is dried and the ether solution concentrated by evaporation. The residue is distilled, giving 4(5)-(4-hydroxybutyl)-imidazole. In the same manner, the following compounds are prepared:

from 1-methyl-5-(2-aminoethyl)-imidazole:
 1-methyl-5-(2-hydroxyethyl)-imidazole; and
from 2-methyl-4(5)-(2-aminoethyl)-imidazole:
 2-methyl-4(5)-(2-hydroxyethyl)-imidazole.

Example C 16 g. of 2,4-dimethyl-5-(2-hydroxyethyl)-thiazole and 20 g. thionyl chloride are boiled under reflux for 4 hours. Thereafter, the excess thionyl chloride is evaporated, and the residue is distilled in vacuo. 2,4-dimethyl-5-(2-chloroethyl)-thiazole is obtained, B.P. 81°/0.3 mm.

In the same manner, the following compounds are produced:

5-chloromethyl-thiazole;
2,4-dimethyl-5-chloromethyl-thiazole;
2-methyl-5-chloromethyl-thiazole;
2,4-dimethyl-5-(3-chloropropyl)-thiazole;
4-methyl-5-(2-chloropropyl)-thiazole;
3-(2-chloroethyl)-pyrazole;
3-methyl-5-(2-chloroethyl)-pyrazole;
1-methyl-3-chloromethyl-pyrazole;
4-methyl-3-chloromethyl-pyrazole;
1,3-dimethyl-5-chloromethyl-pyrazole;
1,4-dimethyl-5-chloromethyl-pyrazole;
1,5-dimethyl-3-chloromethyl-pyrazole;
4,5-dimethyl-3-chloromethyl-pyrazole;
1,3,4-trimethyl-5-chloromethyl-pyrazole;
3-(1-chloropropyl-1)-pyrazole;
4-methyl-3-(1-chloroethyl-1)-pyrazole;
1,4-dimethyl-3-(1-chloroethyl-1)-pyrazole;
4-(5)-methyl-5(4)-(3-chloropropyl)-imidazole;
4(5)-(3-chloropropyl)-imidazole;
2-methyl-4(5-chloromethyl-imidazole;
1-methyl-5(2-chloroethyl)-imidazole;
2-methyl-4(5)-(2-chloroethyl)-imidazole;
1,4-dimethyl-5-chloromethyl-imidazole; and
4(5)-methyl-5(4)-(2-chloroethyl)-imidazole.

Example D

A mixture of 18 g. of 1-methyl-3-chloromethyl-pyrazole, 1.5 g. of sodium iodide, 14 g. of potassium cyanide, and 200 ml. of acetone is boiled under reflux for 20 hours. The mixture is vacuum-filtered and concentrated by evaporation. The residue is boiled under reflux with 80 ml. of 20% aqueous hydrochloric acid for 5 hours. Thereafter, the mixture is neutralized with sodium hydroxide, concentrated by evaporation, and the residue is boiled under reflux with 100 ml. of ethanol and three drops of concentrated sulphuric acid for 3 hours. The mixture is poured into 600 ml. of water,, neutralized with some drops of aqueous sodium hydroxide, and is extracted with chloroform. The extract is dried with sodium sulphate and concentrated by evaporation. The residue is dissolved in 30 ml. of ether, and this solution is added dropwise to a suspension of 5 g. of lithium aluminum hydride in 100 ml. of ether. The mixture is boiled for 2 hours under a nitrogen atmosphere. Thereafter, 60 ml. of ethyl acetate, 15 ml. of water, and 6 ml. of 15% aqeuous sodium hydroxide are added. The mixture is vacuum filtered, dried with potassium carbonate, concentrated by evaporation, and the residue is boiled with 25 g. of thionyl chloride for 4 hours. After evaporating the excess thionyl chloride, the residue is distilled in vacuo, giving 1-methyl-3-(2-chloroethyl)-pyrazole.

In the same manner, the following compounds are produced:

5-(2-chloroethyl)-thiazole;
2-methyl-5-(2-chloroethyl)-thiazole;
4-methyl-5-(4-chlorobutyl)-thiazole;
2,4-dimethyl-5-(4-chlorobutyl)-thiazole;
3-(3-chloropropyl)-pyrazole;
4-methyl-3-(2-chloroethyl)-pyrazole;
1,5-dimethyl-3-(2-chloroethyl)-pyrazole;
1,3-dimethyl-5-(2-chloroethyl)-pyrazole;
1,4-dimethyl-3-(2-chloroethyl)-pyrazole;
4,5-dimethyl-3-(2-chloroethyl)-pyrazole;
1,4-dimethyl-5-(2-chloroethyl)-pyrazole;
1,3,4-trimethyl-5-(2-chloroethyl)-pyrazole;
3-(1-chlorobutyl-2-)-pyrazole;
4-methyl-3-(1-chloropropyl-2)-pyrazole;
4(5)-methyl-5(4)-(4-chlorobtuyl)-imidazole; and
1,4-dimethyl-5-(2-chloroethyl)-imidazole.

Example E

To a solution of 2.3 g. of sodium in 50 ml. of ethanol 17 g. of diethyl malonate and 13.5 g. of 5-chloromethyl-thiazole are added. The mixture is warmed to 70° with stirring for 3 hours and after that time is concentrated by evaporation. 150 ml. of 20% aqueous hydrochloric acid are added to the residue, and this mixture is boiled under reflux for 15 hours. Thereafter, the mixture is neutralized with sodium hydroxide, concentrated by evaporation, and the residue is boiled under reflux with 100 ml. of ethanol and three drops of concentrated sulphuric acid for 3 hours. The mixture is poured into 600 ml. of water, neutralized with some drops of aqueous sodium hydroxide, and is extracted with chloroform. The extract is dried with sodium sulphate and concentrated by evaporation. The residue is dissolved in 30 ml. of ether, and this solution is added dropwise to a suspension of 5 g. of lithium aluminium hydride in 100 ml. of ether. The mixture is boiled for 2 hours under a nitrogen atmosphere. Thereafter, 60 ml. of ethyl acetate, 15 ml. of water, and 6 ml. of 15% aqueous sodium hydroxide are added. The mixture is vacuum filtered, dried with potassium carbonate, concentrated by evaporation, and the residue is boiled with 25 g. of thionyl chloride for 4 hours. After evaporating the excess thionyl chloride, the residue is distilled in vacuo, giving 5-(3-chloropropyl)-thiazole.

In the same manner, the following compounds are produced:

2-methyl-5-(3-chloropropyl)-thiazole;
5-(4-chlorobutyl)-thiazole;
2-methyl-5-(4-chlorobutyl)-thiazole;
3-(4-chlorobutyl)-pyrazole;
3-methyl-5-(3-chloropropyl)-pyrazole;
3-methyl-5-(4-chlorobutyl)-pyrazole;
1-methyl-3-(4-chlorobutyl)-pyrazole;
1-methyl-3-(3-chloropropyl)-pyrazole;
4-methyl-3-(3-chloropropyl)-pyrazole;
4-methyl-3-(4-chlorobutyl)-pyrazole;
1,3-dimethyl-5-(4-chlorobutyl)-pyrazole;
1,3-dimethyl-5-(3-chloropropyl)-pyrazole;
1,4-dimethyl-3-(3-chloropropyl)-pyrazole;
1,4-dimethyl-3-(4-chlorobutyl)-pyrazole;
1,5-dimethyl-3-(4-chlorobutyl)-pyrazole;
1,5-dimethyl-3-(3-chloropropyl)-pyrazole;
4,5-dimethyl-3-(3-chloropropyl)-pyrazole;
4,5-dimethyl-3-(4-chlorobutyl)-pyrazole;
1,4-dimethyl-5-(4-chlorobutyl)-pyrazole;
1,4-dimethyl-5-(3-chloropropyl)-pyrazole;
1,3,4-trimethyl-5-(3-chloropropyl)-pyrazole;
1,3,4-trimethyl-5-(4-chlorobutyl)-pyrazole;
4-methyl-3-(1-chlorobutyl-3)-pyrazole;
4(5)-(4-chlorobutyl)-imidazole;
1-methyl-5-(3-chloropropyl)-imidazole;
1-methyl-5-(4-chlorobutyl)-imidazole;
2-methyl-4(5)-(4-chlorobutyl)-imidazole;
2-methyl-4(5)-(3-chloropropyl)-imidazole;
1,4-dimethyl-5-(3-chloropropyl)-imidazole; and
1,4-dimethyl-5-(4-chlorobutyl)-imidazole.

Example F 10 g. of 2,4-dimethyl-5-hydroxymethyl-thiazole are dissolved in 100 ml. of acetone, and the solution is stirred with 50 g. of active manganese dioxide at room temperature for 5 hours. Thereafter, the mixture is filtered over 40 g. of kieselguhr and concentrated by evaporation. There was obtained, upon distillation, 2,4-dimethyl-thiazole-5-aldehyde, B.P. 62–64°/0.05 mm.

A solution of 91.7 g. of N-(4-methyl-thiazolyl-2)-piperazine, 78.7 g. of 1-bromo-3-chloro-propane, and 50.5 g. of triethyl amine in 600 ml. of benzene is boiled under reflux for 6 hours. The mixture is vacuum-filtered, and the filtrate is extracted with 1 N aqueous hydrochloric acid. The acidic aqueous extract is made alkaline with 2 N aqueous sodium hydroxide and is extracted once more with chloroform. This extract is concentrated by evaporation, and the residue, after purification by column chromatography, is distilled in vacuo. N-(3-chloropropyl-1)-N'-(4 - methyl - thiazolyl - 2)-piperazine, B.P. 146–151°/0.01 mm., is thus obtained.

A Grignard reagent is prepared from 2.7 g. of magnesium and 25.9 g. of N-(3-chloropropyl-1)-N'-(4-methyl-thiazolyl-2)-piperazine in 40 ml. of tetrahydrofuran. A solution of 12.7 g. of 2,4-dimethyl-thiazole-5-aldehyde in 25 ml. of tetrahydrofuran is added dropwise with stirring. After standing at room temperature for 16 hours, 5 ml. of water are added, and the solvent is distilled off in vacuo. The residue, with cooling, is acidified with 2 N aqueous hydrochloric acid, and is extracted with ether. The remaining acidic aqueous phase is made alkaline with concentrated aqueous ammonia, and is extracted with chloroform. After drying over potassium carbonate, the extract is concentrated by evaporation, and the residue is purified by chromatography. N-[4-hydroxy-4-(2,4-dimethyl-thiazolyl - 5) - butyl - 1]-N'-(4-methyl-thazolyl-2)-piperazine is thus obtained.

30 g. of N - [4 - hydroxy-4-(2,4-dimethyl-thiazolyl-5) - butyl - 1] - N' - (4-methyl-thiazolyl-2)-piperazine is boiled under reflux with 250 ml. of 70% aqueous sulphuric acid for 2½ hours. Thereafter, the mixture, with cooling, is made alkaline with 32% aqueous sodium hydroxide, and is extracted with ether. After drying with potassium carbonate, the ether is distilled off, and the residue is mixed with 100 ml. 5 N isopropanolic hydrochloric acid. The precipitated hydrochloride of N-[4-(2,4-dimethyl-thiazolyl - 5) - buten-3-yl-1]-N'-(4-methyl-thiazolyl-2)-piperazine, after recrystallizing from methanol/ether, melts at 243–245° with decomposition.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all temperatures are set forth in degrees centigrade.

EXAMPLE 1

14.5 g. of 3-methyl-5-(2-chloroethyl)-pyrazole and 36.6 g. of N-(4-methyl-thiazolyl-2)-piperazine are mixed and introduced into a 100° hot bath. The reaction mixture is heated to 120–130° C., whereupon the temperature rapidly rises to about 150–160° and then drops again. During this procedure, the mixture partially solidifies. Five minutes after reaching the maximum temperature, the reaction mixture is cooled, extracted with ether, fil- filtered and concentrated by evaporation. The residue, dissolved in a mixture of 4 parts (by volume) of acetone, 3 of benzene, 2 of chloroform and 1 of methanol, is filtered, over 100 g. of silica gel. The eluate is concentrated by evaporation and the thus-obtained crude N-[2-(3-methyl-pyrazolyl-5)-ethyl] - N' - (4-methyl-thiazolyl-2)-piperazine is dissolved in ethanol and mixed with ethereal hydrochloric acid. The trihydrochloride hydrate is obtained, M.P. 254–256° C.

In the same manner, the following compounds are obtained, using N-(4-methyl-thiazolyl-2)-piperazine as the starting material:

from 4-methyl-5-(2-chloroethyl)-thiazole:
  N-[2-(4-methyl-thiazolyl-5-ethyl] - N' - (4-methyl-thiazolyl-2)-piperazine, B.P. 184–188°/0.05 mm.; trihydrochloride, M.P. 226–228°;
from 4-methyl-5-(4-chlorobutyl)-thiazole:
  N-[4-(4 - methyl - thiazolyl - 5)-butyl]N'-(4-methyl-thiazolyl-2)-piperazine, B.P. 195–198°/0.05 mm.;
from 2,4-dimethyl-5-(2-bromoethyl)-thiazole:
  N-[2-(2,4-dimethyl-thiazolyl-5)-ethyl] - N' - (4-methyl-thiazolyl-2)-piperazine, B.P. 200–205°/0.05 mm.;
from 2,4-dimethyl-5-(3-chloropropyl)-thiazole:
  N-[3-(2,4 - dimethyl-thiazolyl-5)-propyl]-N'-(4-methyl-thiazolyl-2)-piperazine, B.P. 202–204°/0.01 mm.;
from 2,4-dimethyl-5-(4-chlorobutyl)-thiazole:
  N-[4-(2,4 - dimethyl-thiazolyl-5)-butyl]-N'-(4-methyl-thiazolyl-2)-piperazine, B.P. 205–210°/0.01 mm; dimaleate, M.P. 130–131°;
from 1,5-dimethyl-3-(2-chloroethyl)-pyrazole:
  N-[2-(1,5-dimethyl-pyrazolyl-3)-ethyl]-N'-(4 - methyl-thiazolyl-2)-piperazine, B.P. 202–205°/0.05 mm.;
from 1,5-dimethyl-3-(3-chloropropyl)-pyrazole:
  N-[3-(1,5 - dimethyl-pyrazolyl-3)-propyl]-N'-(4-methyl-thiazolyl-2)-piperazine, B.P. 203–206°/0.05 mm.;
from 1,5-dimethyl-3-(4-chlorobutyl)-pyrazole:
  N-[4-(1,5-dimethyl-pyrazolyl-3-butyl]-N'-(4-methyl-thiazolyl-2)-piperazine, B.P. 206–208°/0.05 mm.;
from 1,3-dimethyl-5-(2-chloroethyl)-pyrazole:
  N-[2-(1,3-dimethyl-pyrazolyl-5)-ethyl]-N'-(4 - methyl-thiazolyl-2)-piperazine, B.P. 200–203°/0.05 mm.;
from 1,3-dimethyl-5-(4-chlorobutyl)-pyrazole:
  N-[4-(1,3 - dimethyl-pyrazolyl-5)-butyl]-N'-(4-methyl-thiazolyl-2)-piperazine, B.P. 205–208°/0.05 mm.;
from 4(5)-(2-chloroethyl)-imidazole:
  N-[2-(imidazolyl-4(5))-ethyl]-N'-(4-methyl-thiazolyl-2)-piperazine; dimaleate, M.P. 129–131°;
from 4(5)-(4-chlorobutyl)-imidazole:
  N-[4-(imidazolyl-4(5))-butyl]-N'-(4-methyl-thiazolyl-2)-piperazine; dimaleate, M.P. 130–132°;
from 1-methyl-5-(2-chloroethyl)-imidazole:
  N-[2-(1-methyl-imidazolyl-5)-ethyl] - N' - (4-methyl-thiazolyl-2)-piperazine; B.P. 198–201°/0.05 mm.;
from 1-methyl-5-(3-chloropropyl)-imidazole;
  N-[3-(1-methyl-imidazolyl-5)-propyl]-N'-(4-methyl-thiazolyl-2)-piperazine, B.P. 201–204°/0.05 mm.; and
from 1-methyl-5-(4-chlorobutyl)-imidazole:
  N-[4-(1 - methyl - imidazolyl - 5)-butyl]-N'-(4-methyl-thiazolyl-2)-piperazine, B.P. 206–208°/0.05 mm.

When N-(thiazolyl-2)-piperazine is employed as the starting material, the following compounds are obtained:

from 2,4-dimethyl-5-(4-bromobutyl)-thiazole:
  N-[4-(2,4-dimethyl-thiazolyl-5)-butyl]-N'-(thiazolyl-2)-piperazine, B.P. 206–208°/0.05 mm.;
from 3-methyl-5-(2-bromoethyl)-pyrazole:
  N-[2-(3-methyl-pyrazolyl-5)-ethyl]-N'-(thiazolyl-2)-piperazine; dimaleate, M.P. 129–130°; and
from 4(5)-(2-bromoethyl)-imidazole:
  N-[2-(imidazolyl-4(5)-ethyl]-N'-(thiazolyl-2)-piperazine; dimaleate, M.P. 130–132°.

EXAMPLE 2

14.1 g. of 2-dimethyl-5-formyl-thiazole and 18.3 g. of N-(4-methyl-thiazolyl-2)-piperazine are shaken for 10 hours in the presence of 1 g. of Raney nickel in 300 ml. of ethanol at 90 atmospheres hydrogen pressure and 40–70°. The reaction mixture is filtered, concentrated by evaporation, and N-(2,4-dimethyl-thiazolyl-5-methyl)-N'-(4-methyl-thiazolyl-2)-piperazine is obtained, B.P. 170–175°/0.01 mm.

In the same manner, the following compounds are produced from N-(4-methyl-thiazolyl-2)-piperazine;

with 2,4-dimethyl-5-(3-formylpropyl)-thiazole:
  N-[4-(2,4-dimethyl-thiazolyl-5)-butyl]-N'-(4-methyl-thiazolyl-2)-piperazine, B.P. 205–210°/0.01 mm.; and
with 3-methyl-pyrazolyl-5-acetaldehyde:
  N-[2-(3-methyl-pyrazolyl-5)-ethyl]-N'-(4-methyl-thiazolyl-2)-piperazine; trihydrochloride hydrate, M.P. 254–256°.

EXAMPLE 3

25.3 g. of N-[4-2,4-dimethyl-thiazolyl-5)-butyl]-piperazine (B.P. 152–155°/0.1 mm.) and 9 g. of 2-bromo-4-methyl-thiazole are heated for 1 hour to 100°. After cooling, the reaction mixture is mixed with aqueous ammonia and extracted with ether. The base mixture remaining after the ether has been removed by evaporation is distilled, thus obtaining N-[4-(2,4-dimethyl-thiazolyl-5)-butyl] - N' - (4-methyl-thiazolyl-2)-piperazine, B.P. 205–210°/0.01 mm.

In the same manner, the following compounds are produced: N - [2- (3 - methyl-pyrazolyl-5)-ethyl]-N'-(4-methyl-thiazolyl-2)-piperazine; trihydrochloride hydrate, M.P. 254–256°; is obtained from the reaction of 2-bromo-4 - methyl-thiazole with N - [2-(3-methyl-pyrazolyl-5)-ethyl]-piperazine;

N - [4 - (3-methyl pyrazolyl-5)-butyl]-N'-(4-methyl-thiazolyl-2)-piperazine; dimaleate, M.P. 125–127°; is obtained from the reaction of 2-chloro-4-methyl-thiazole with N-[4-(3-methyl-pyrazolyl-5)-butyl]-piperazine.

EXAMPLE 4

18.4 g. of 1-(2,4-dimethyl-thiazolyl-5)-4-aminobutane (B.P. 103–105°/0.05 mm.) produced in the conventional manner from 1-(2,4-dimethyl-thiazolyl-5)-4-chlorobutane and ammonia, and 23.9 g. of 2-bis-(2-chloro-ethyl)-amino-4-methyl-thiazole, which can be produced from 2-bromo-4-methyl-thiazole by reaction with diethanolamine and subsequent reaction of the reaction product with thionyl chloride, are boiled under reflux for 24 hours in a mixture of 600 ml. of acetone and 600 ml. of water. Thereafter, the reaction mixture is concentrated, made alkaline with a solution of sodium hydroxide, and extracted with benzene. The extract is dried and the benzene solution concentrated by evaporation. N-[4-(2,4-dimethyl - thiazolyl - 5) - butyl]-N'-(4-methyl-thiazolyl-2)-piperazine is obtained, B.P. 205–210°/0.01 mm.

In the same manner, N-[2-(3-methyl-pyrazolyl-5)-ethyl] - N' - (4-methyl-thiazolyl-2)-piperazine; trihydrochloride hydrate, M.P. 254–256°; is obtained by the reaction of 2-bis-(2-chloroethyl)-amino-4-methyl-thiazole with 1-(3-methyl-pyrazolyl-5)-2-aminoethane.

EXAMPLE 5

3 g. of N-(4-methyl-thiazolyl-2)-N'-[4-(2',4'-dimethyl-thiazolyl-5')-butyl]-ethylenediamine, obtained by the reaction of 1-(2,4-dimethyl-thiazolyl-5)-4-aminobutane and ethyleneimine in the presence of aluminum chloride followed by the reaction of the ethylenediamine derivative with 2-bromo-4-methyl-thiazole, is agitated for 10 hours in 500 ml. of boiling xylene in the presence of 2 g. of ethylene dibromide and 25 g. of anhydrous pulverized sodium carbonate. After working up the reaction product by chromatography, N - [4 - (2,4-dimethyl-thiazolyl-5)-butyl]-N'-(4-methyl-thiazolyl-2)-piperazine is obtained, B.P. 205–210°/0.01 mm.

In the same manner, N-[2-(3-methyl-pyrazolyl-5)-ethyl] - N' - (4-methyl-thiazolyl-2)-piperazine; trihydrochloride hydrate, M.P. 254–256°; is obtained by the reaction of ethylene dibromide with N-[2-(3-methyl-pyrazolyl - 5) - ethyl]-N'-(4-methyl-thiazolyl-2)-ethylenediamine.

EXAMPLE 6

3 g. of N-(thiazolyl-2)-N'-[3-(2-,4-dimethyl-thiazolyl-5)-allyl]-piperazine (obtained by condensation of 2,4-dimethyl-thiazole-5-aldehyde with malonic acid to produce the corresponding thiazolyl-acrylic acid, reaction of the acid with diazomethane, reduction of the ester with lithium aluminum hydride to the corresponding thiazolyl-allyl alcohol, conversion of the alcohol into the methanesulfonate ester, and reaction of the latter with N-thiazolyl-2)-piperazine) is hydrogenated using 0.5 g. of 5% palladium-charcoal catalyst in 40 ml. of methanol at normal pressure and room temperature until the reaction is terminated. The reaction product is filtered and concentrated by evaporation. The residue is mixed with ethereal hydrochloric acid to produce N-[3-(2,4-dimethyl-thiazolyl-5)-propyl]-N'-(thiazolyl-2) - piperazine - trihydrochloride which decomposes starting at 250°.

N - [4-(2,4-dimethyl-thiazolyl-5)-butyl]-N'-(4-methyl-thiazolyl-2)-piperazine, B.P. 205–210°/0.01 mm., is obtained by hydrogenating N-[4-(2,4-dimethyl-thiazolyl-5)-3-buten-1-yl]-N'-(4-methyl-thiazolyl-2)-piperazine.

N-[2-(3-methyl-pyrazolyl-5)-ethyl]-N'-(4-methyl - thiazolyl-2)-piperazine; trihydrochloride hydrate, M.P. 254–256°; is obtained by hydrogenating N-[2-(3-methyl-pyrazolyl-5)-vinyl]-N'-(4-methyl-thiazolyl-2)-piperazine.

EXAMPLE 7

3.3 g. of 4-(4-methyl-thiazolyl-5)-butyric acid-N'-thiazolyl-2)-piperazide (obtained from 4-(4-methyl-thiazolyl-5)-butyric acid ethyl ester and N-(thiazolyl-2)-piperazine) is boiled for 24 hours under a nitrogen atmosphere in 100 ml. of absolute tetrahydrofuran with 1 g. of lithium aluminum hydride. After mixing with ethyl acetate, 4 ml. of water and 1 ml. of 15% aqueous sodium hydroxide are added. The reaction mixture is vacuum-filtered, washed with absolute ethanol, and the combined filtrates are concentrated by evaporation. The residue is distilled, giving N - [4-(4-methyl-thiazolyl-5)-butyl]-N'-(thiazolyl-2)-piperazine, B.P. 190–195°/0.01 mm.

In the same manner, the following compounds are produced:

from 4 - (2,4 - dimethyl-thiazolyl-5)-butyric acid-N'-(4-methyl-thiazolyl-2)-piperazide: N-[4-(2,4-dimethyl-thiazolyl - 5)-butyl]-N'-(4-methyl-thiazolyl-2)piperazine, B.P. 205–210°/0.01 mm.; and from 3-methyl-pyrazolyl-5-acetic acid-N'-(4-methyl-thiazolyl - 2) - piperazide: N - [2-(3-methyl-pyrazolyl-5)-ethyl]-N'-(4-methyl-thiazolyl-2)-piperazine; trihydrochloride hydrate, M.P. 254, 256°.

EXAMPLE 8

248 g. of 2,4-dimethyl-5-(4-bromobutyl)-thiazole, 183 g. of N-(4-methyl-thiazolyl-2)-piperazine and 84 g. of sodium bicarbonate are boiled with stirring in 2,500 ml. of ethanol for 24 hours. The reaction mixture is filtered and concentrated by evaporation. There was obtained, upon distillation N-[4-(2,4-dimethyl-thiazolyl-5)-butyl]-N' - (4 - methyl-thiazolyl-2)-piperazine, B.P. 205–210°/0.01 mm.

In place of ethanol, methanol, isopropanol, n-propanol, n-butanol, benzene, toluene or aqueous acetone can be used.

The reaction time required for complete reaction will be lengthened or shortened in relationship to the boiling point of the solvent. In place of sodium bicarbonate, equivalent amounts of sodium or potassium carbonate can also be used.

In place of 2,4-dimethyl-5-(4-bromobutyl)-thiazole, there may be used the sulfonic acid esters of 2,4-dimethyl-5 - (4 - hydroxybtuyl-thiazole, e.g. 2,4-dimethyl-5-(4-methanesulfonyloxybutyl)-thiazole; 2,4 - dimethyl-5-(4-benzenesulfonyloxybutyl)-thiazole; or 2,4-dimethyl-5-(4-p-toluenesulfonyloxybutyl)-thiazole.

The following examples include pharmaceutical compositions of the novel compounds.

EXAMPLE 9

Tablets

| | Mg. |
|---|---|
| Each tablet contains N-[4-(2,4-dimethyl-thiazolyl-5)-butyl]-N'-(4 - methyl-thiazolyl - 2)-piperazine dimaleate | 5 |
| Lactose | 70 |
| Corn starch | 23 |
| Magnesium stearate | 2 |

EXAMPLE 10

Coated tablets

| | Mg. |
|---|---|
| Each tablet contains N-[4-(2,4-dimethyl-thiazolyl-5)-butyl]-N'-(4 - methyl-thiazolyl - 2)-piperazine dimaleate | 4 |
| Lactose | 75 |
| Potato starch | 16 |
| Talc | 5 |

The coating 150 mg. is a conventional mixture of corn starch, sugar, talc, and tragacanth.

EXAMPLE 11

Solution for injection

A solution of 1.5 kg. of N-[4-(2,4-dimethyl-thiazolyl-5) - butyl]-N'-(4-methyl-thiazolyl-2)-piperazine dimaleate in 2,500 liters of twice distilled water is prepared and filled into 5 ml. ampoules in a manner that each ampoule contains 3 mg. of said dimaleate.

EXAMPLE 12

Syrup

| | Kg. |
|---|---|
| A mixture of N-[4 - (2,4 - dimethyl-thiazolyl-5)-butyl]-N'-(4 - methyl-thiazolyl - 2)-piperazine dimaleate | 0.10 |
| Glycerol (twice distilled) | 7.50 |
| Cane sugar | 56.00 |
| Methyl p-hydroxybenzoate | 0.07 |
| n-Propyl p-hydroxybenzoate | 0.03 |
| Ethanol | 10.00 |
| Fruit flavorings | 0.10 | is prepared and mixed with twice distilled water in such a manner that the volume of the entire preparation is 100 l. A dosage unit (6 ml.) contains 5 mg. of active substance.

Instead of the dimaleate, other physiologically compatible acid addition salts N-[4-(2,4-dimethyl-thiazolyl-5)-butyl]-N'-(4-methyl-thiazolyl-2)-piperazine or the free base or other compounds of Formula I as well as their physiologically compatible acid addition salts can be incorporated into similar compositions.

The above or similar compositions are applied to mammals as is customary for compositions of this kind.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The embodiments of the invention in which an exclusive property or privilege is claimed are defined as follows:

1. A member of the group consisting of a compound of the formula

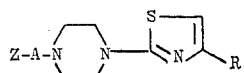

wherein Z is thiazolyl-5 substituted by 0–2 methyl groups; A is alkylene of 1–4 carbon atoms; and R is H or $CH_3$; and physiologically acceptable acid addition salts thereof.

2. A member of claim 1 wherein the compound is N-[2-(4 - Methyl-thiazolyl-5)-ethyl]-N'-(4-methyl-thiazolyl-2)-piperazine.

3. A member of claim 1 wherein the compound is N-[4-Methyl-thiazolyl - 5)-butyl]-N'-(4 - methyl-thiazolyl-2)-piperazine.

4. A member of claim 1 wherein the compound is N-[2-(2,4 - Dimethyl-thiazolyl - 5)-ethyl]-N'-(4-methyl-thiazolyl-2)-piperazine.

5. A member of claim 1 wherein the compound is N-[3 - (2,4 - Dimethyl-thiazolyl - 5)-propyl]-N'-(4-methyl-thiazolyl-2)-piperazine.

6. A member of claim 1 wherein the compound is N-[4 - (2,4 - Dimethyl-thiazolyl - 5)-butyl]-N'-(4-methyl-thiazolyl-2)-piperazine.

7. A member of claim 1 wherein the compound is N-[4 - (2,4 - Dimethyl-thiazolyl - 5)-butyl]-N'-(thiazolyl-2)-piperazine.

8. A member of claim 1 wherein the compound is N-(2,4 - Dimethyl-thiazolyl - 5 - methyl)-N'-(4-methyl-thiazolyl-2)-piperazine.

9. A member of claim 1 wherein the compound is N-[3 - (2,4 - Dimethyl-thiazolyl - 5)-propyl]-N'-(thiazolyl-2)-piperazine.

10. A member of claim 1 wherein the compound is N-[4 - (4 - Methyl-thiazolyl - 5)-butyl]-N'-(thiazolyl - 2)-piperazine.

11. A compound of claim 1 wherein Z is 2-methyl-thiazolyl-5.

12. A compound of claim 1 wherein Z is 4-methyl-thiazolyl-5.

13. A compound of claim 1 wherein Z is 2,4-dimethyl-thiazolyl-5.

References Cited

UNITED STATES PATENTS

| | | | |
|---|---|---|---|
| 2,794,804 | 6/1957 | Kushner | 260—268 |
| 2,837,522 | 6/1958 | Bach et al. | 260—268 |
| 3,367,936 | 2/1968 | Koppe et al. | 260—268 |
| 3,470,184 | 9/1969 | Arya | 260—268 |
| 3,489,757 | 1/1970 | Koppe et al. | 260—268 |

DONALD G. DAUS, Primary Examiner

U.S. Cl. X.R.

260—243 B, 247.5 R, 268 DK, 268 C, 302 H, 302 R, 309, 310 R; 424—250